United States Patent
Levay et al.

(10) Patent No.: US 6,480,892 B1
(45) Date of Patent: Nov. 12, 2002

(54) APPARATUS AND METHOD FOR INSERTING PREDETERMINED PACKET LOSS INTO A DATA FLOW

(75) Inventors: Robert J. Levay, San Jose; Gregory V. Kaiser, Mountain View, both of CA (US)

(73) Assignee: Siemens Information and Communication Networks, Inc., Boca Raton, FL (US)

(*) Notice: Subject to any disclaimer, the term of this patent is extended or adjusted under 35 U.S.C. 154(b) by 0 days.

(21) Appl. No.: 09/216,633

(22) Filed: Dec. 16, 1998

(51) Int. Cl.[7] ............................................. G06F 13/00
(52) U.S. Cl. ..................................................... 709/224
(58) Field of Search ................................. 709/224, 249, 709/253; 713/201; 370/401, 403, 239, 395

(56) References Cited

U.S. PATENT DOCUMENTS

| | | | | |
|---|---|---|---|---|
| 5,627,829 A | * | 5/1997 | Gleeson et al. ............. | 370/230 |
| 5,629,936 A | | 5/1997 | Lee et al. .................... | 370/230 |
| 5,848,233 A | * | 12/1998 | Radia et al. ................. | 713/201 |
| 6,006,275 A | * | 12/1999 | Picazo, Jr. et al. .......... | 709/249 |
| 6,070,242 A | * | 5/2000 | Wong et al. ................. | 713/201 |
| 6,104,696 A | * | 8/2000 | Kadambi et al. ............ | 370/218 |
| 6,105,027 A | * | 8/2000 | Schneider et al. ............ | 707/9 |
| 6,147,976 A | * | 11/2000 | Shand et al. ................. | 370/254 |
| 6,154,446 A | * | 11/2000 | Kadambi et al. ............ | 370/239 |
| 6,182,228 B1 | * | 1/2001 | Boden et al. ................ | 713/201 |

* cited by examiner

*Primary Examiner*—David Wiley

(57) ABSTRACT

A test apparatus (12) and method (110) are provided for inserting predetermined packet loss into a data flow between a plurality of hosts on a packet-switched network. The test apparatus (12) can include a first network interface (20), a second network interface (22) and a packet filter (24). The first network interface (20) receives a sequence of data packets from a source host (14) under test. Incoming data packets are passed to the packet filter (24), which selectively discards predetermined ones of the data packets to generate a reduced sequence of data packets. The second network interface (22) transfers the reduced sequence of data packets over the network (18) to the destination host (16). The test apparatus (12) can be used accurately to measure the effect of packet loss on media applications transmitting real-time data, such as voice and audio, over packet-switched networks.

18 Claims, 5 Drawing Sheets

APPARATUS AND METHOD FOR INSERTING PREDETERMINED PACKET LOSS INTO A DATA FLOW

BACKGROUND OF THE INVENTION

1. Field of the Invention

The present invention generally relates to computer network test equipment, and in particular, to a system and method for generating a predetermined amount of packet loss on a packet-switched network.

2.. Description of the Related Art

More frequently than ever before, packet-switched networks are being used to transport real-time data, such as video and audio information. A packet-switched network transports data by dividing it into separate packets of information. These packets are then routed through the network and reassembled into the original data at a destination within the network. Although packet-switched protocols typically include mechanisms for insuring reliable delivery of packets, it sometimes happens that some of the packets are lost during transport. Network congestion is a frequent cause of packet loss. When a packet-switched network becomes overly congested, data buffers in the network overflow. In response to buffer overflow, network devices, such as routers, drop packets already in the buffers in order to store incoming packets. This results in packet loss.

Packet loss diminishes the quality of real-time video and audio transmitted over packet-switched networks. In efforts to improve the quality of video and audio presentations, developers often test the effect of packet loss on real-time networked applications. However, the precise effect of packet loss on real-time data transfers is rather difficult to measure using current test equipment.

To measure the effect of packet loss on a real-time application, network traffic between two devices under test must be captured and analyzed. To accomplish this, a combination of routers, multi-port repeaters, multi-port bridges, packet generators, and network analyzers is assembled into a test configuration. The packet generators are then configured to produce excess network traffic, forcing queues and buffers in the routers to overflow, resulting in packet loss.

Because network devices, such as routers, are designed to ensure that packets are not discarded, they cannot predictably produce a given amount of packet loss. Configuring the combination of network devices to generate a desired packet loss is generally a hit-or-miss proposition, and is thus time-consuming. In addition, test results are often not repeatable and vary with each test iteration. Further drawbacks of such a test configuration are that multiple network analyzers must be used to capture network traffic and manual accounting is required to determine actual packet loss. Thus, using current techniques, testing the effect of packet loss on real-time networked applications is time-consuming, inaccurate and expensive.

SUMMARY OF THE INVENTION

According to one embodiment of the present invention, a test apparatus includes a first network interface, a packet filter, and a second network interface. The test apparatus can be placed in-line between two host devices on a network. In this configuration, the first network interface receives a sequence of data packets included in the data flow between the hosts. The received data packets are then passed to the packet filter, which selectively discards one or more of the packets according to a predetermined rules table, resulting in a reduced sequence of packets. The reduced packet sequence is then transferred to the destination host over the network by the second network interface.

The rules table is software configurable to permit a user to predictably vary the amount of packet loss occurring between the two hosts. By varying the amount of packet loss in a predetermined manner, the effect on real-time applications, such as video conferencing software, can be accurately measured.

BRIEF DESCRIPTION OF THE DRAWINGS

A better understanding of the invention is obtained when the following detailed description is considered in conjunction with the following drawings in which.

DETAILED DESCRIPTION OF THE INVENTION

Figure 1:
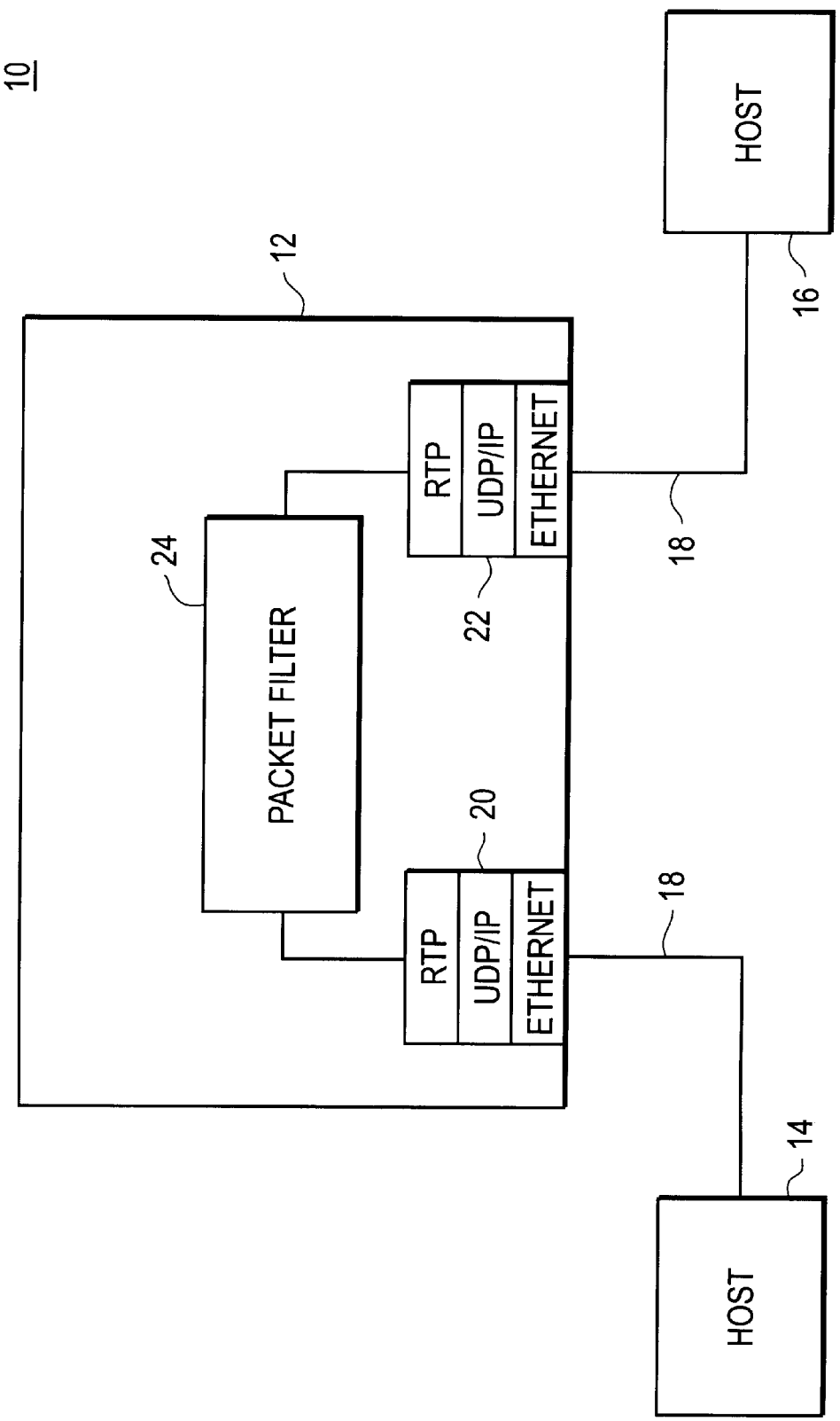
FIG. 1 is a block diagram illustrating a system for inserting packet loss in accordance with one embodiment of the present invention.

Turning now to the figures, and in particular to FIG. 1, there is illustrated a system 10 for inserting predetermined packet loss into data flow on a packet-switched network. The system 10 includes a test apparatus 12 connected to a packet-switched network 18 between a pair of hosts 14–16.

The hosts 14–16 can be any devices capable of networked communications using a packet-switched network, such as a conventional personal computer (PC) or computer workstation having a standard local area network (LAN) card, such as an Ethernet card, and software for networked communication using a conventional packet-switched protocol such as UDP/IP (User Datagram Protocol/Internet Protocol), TCP/IP (Transmission Control Protocol/Internet Protocol), or the like. Each host 14–16 can be a source or destination for real-time data, such as video, audio, or the like. All network traffic passing between the hosts 14–16 passes through the test apparatus 12.

The test apparatus 12 can be any digital device that selectively discards incoming packets, causing predetermined packet loss in the data flow between the hosts 14–16. Accordingly, the test apparatus 12 permits real-time media software on the hosts 14–16 to be tested under various packet loss conditions.

In the example shown, the test apparatus 12 includes a first network interface 20, a packet filter 24, and a second network interface 22. The network interfaces 20–22 permit the test apparatus 12 to be coupled to the packet network 18. Each network interface can include a conventional LAN card, such as an Ethernet card or the like, allowing data packets to pass in either direction between the hosts 14–16.

The packet filter 24 receives incoming data packets from one of the interfaces 20–22 and selectively discards one or more of the packets according to a predetermined rules table in order to generate a reduced sequence of packets. The reduced sequence of packets is then transferred by the other network interface over the packet network 18 to the destination host.

Each network interface 20–22 communicates with the packet filter 24 using a protocol stack. In the example shown, an IP is layered above an Ethernet protocol, a UDP is layered above the IP, and a real-time transport protocol (RTP) is layered above the UDP. Each of the above protocols is defined by well known industry standards. The UDP/IP suite is a standard feature of many conventional operating systems, such as UNIX, while the Ethernet protocol can be implemented using a standard LAN card and software drivers. The RTP can be implemented using one or more software programs included in a library of functions.

The test apparatus 12 can be implemented using a conventional computer workstation, such as a Sparc station running a UNIX operating system (OS), manufactured by Sun Microsystems. The network interfaces 20–22 can be standard LAN cards included in the workstation, while the protocol stack and packet filter 24 can be implemented by software stored in a memory. When implemented in software, the packet filter 24 receives and outputs RTP packets by making function calls to access the services of the RTP layer.

Figure 2:
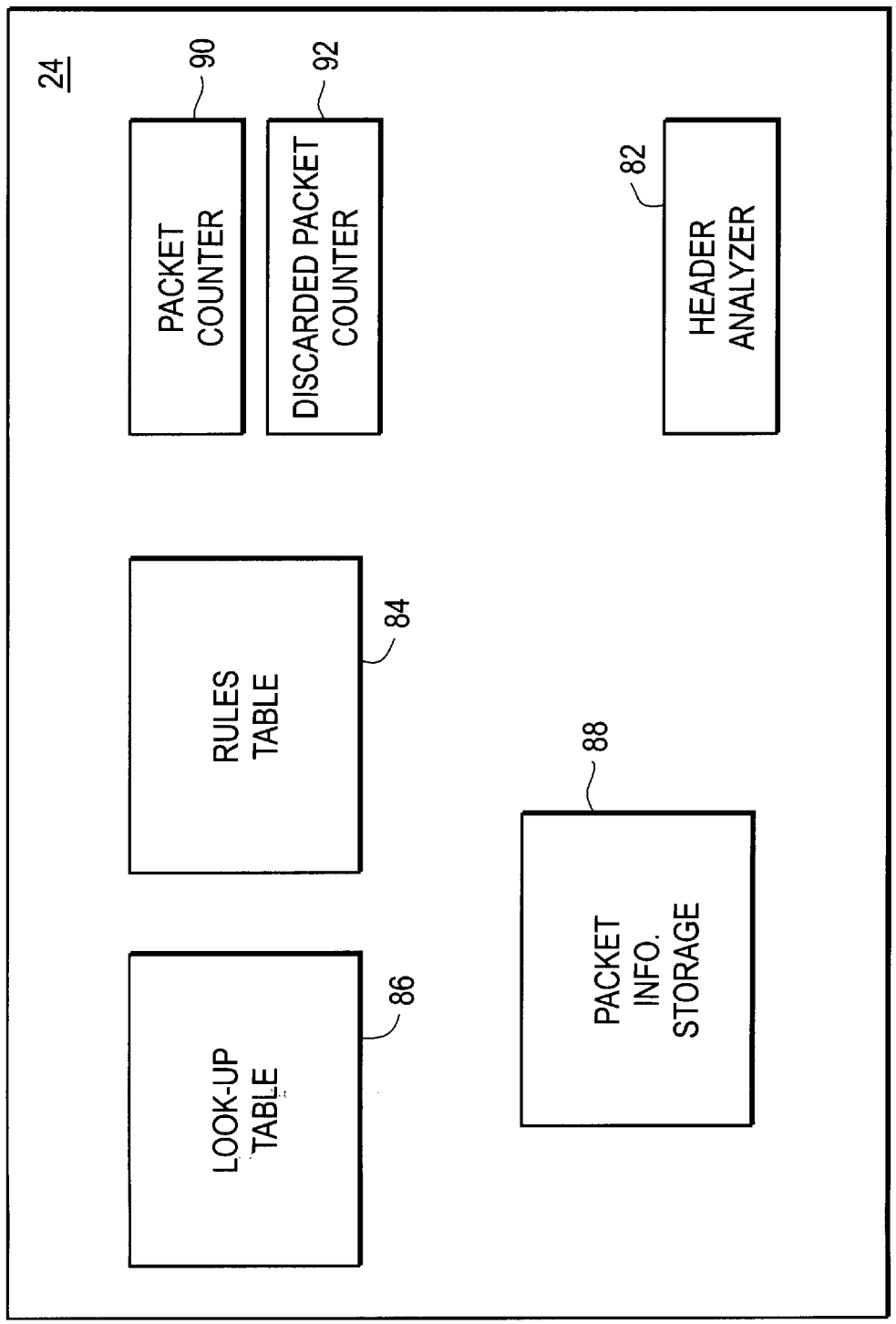
FIG. 2 is a block diagram depicting components included in the packet filter of FIG. 1.

FIG. 2 illustrates a detailed block diagram of the packet filter 24. The packet filter 24 can include a header analyzer 82, a rules table 84, a look-up table 86, a memory 88 for storing packet information, a packet counter 90 and a discarded packet counter 92.

The header analyzer 82 can be a software routine that controls which packets are discarded. This is accomplished by inspecting header information included in each packet transmitted by the end point hosts. The header analyzer 82 can access data contained in the RTP packets by making conventional OS function calls to open a socket for receiving RTP packets. Specifically, the header analyzer 82 can make discard determinations based on information contained in the RTP header, UDP header, and IP header of the RTP packets.

Figure 3:
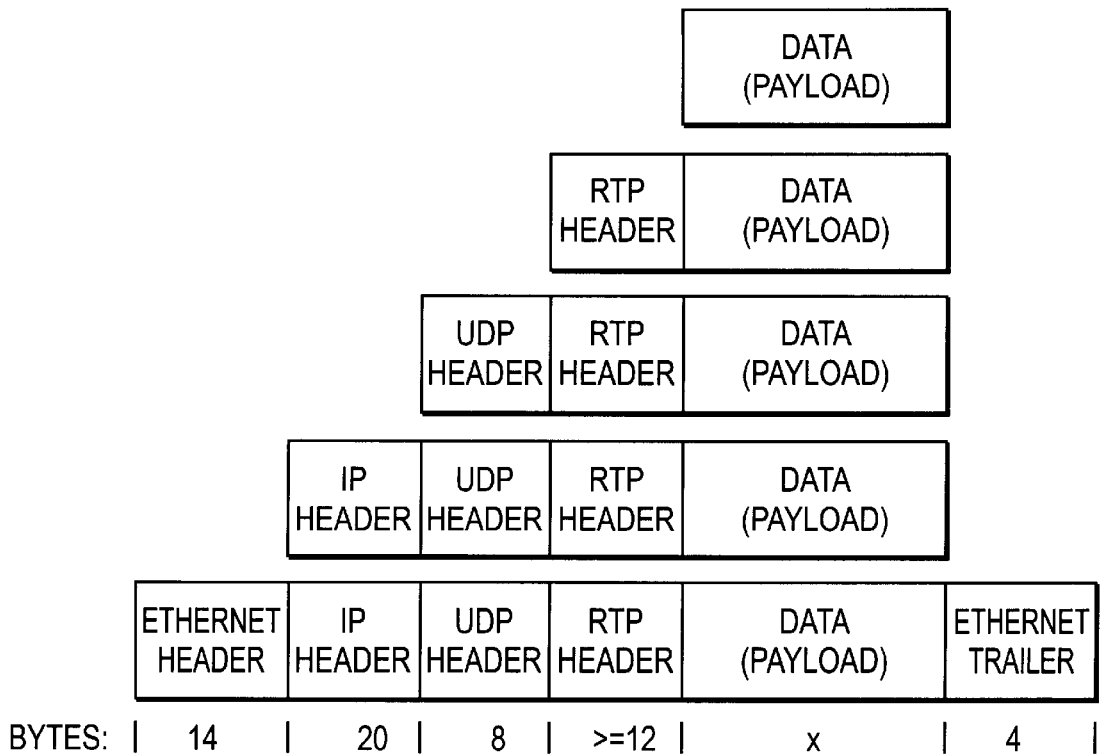
FIG. 3 illustrates encapsulation of data payloads transferred over the packet network shown in FIG. 1.

FIG. 3 illustrates the encapsulation of payload data as it passes through the various protocol layers for the packet-switched network, forming an RTP packet. At each layer within the protocol, a header is prefixed to the data packet. Accordingly, when a data packet is sent over the network, an RTP header is first attached then a UDP header and IP header, and finally an Ethernet header and trailer. Details of the formats of the various headers are shown in FIGS. 4–6.

Figure 4:
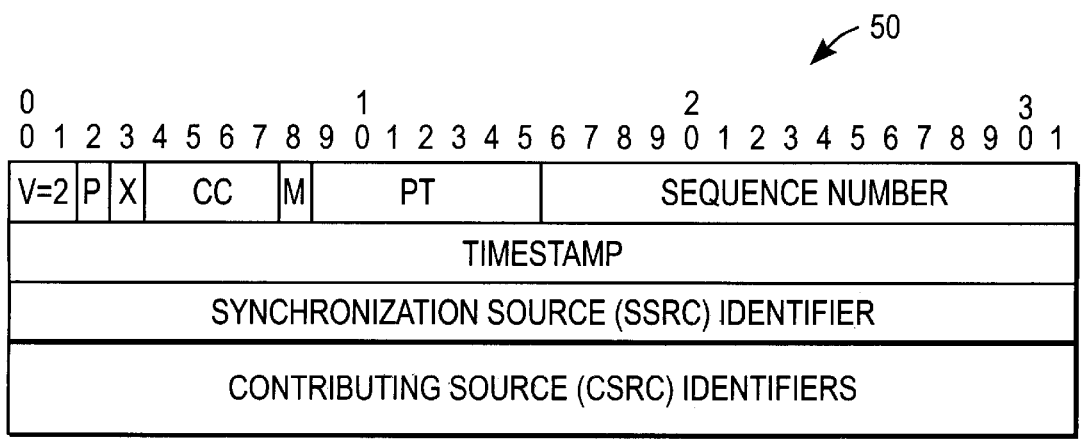
FIG. 4 illustrates the format of the RTP header shown in FIG. 3.

FIG. 4 illustrates a standard RTP header 50, which includes, among other things, a version number 51, a sequence number 52, a time stamp 53 and a payload type (PT) 54.

Figure 5:
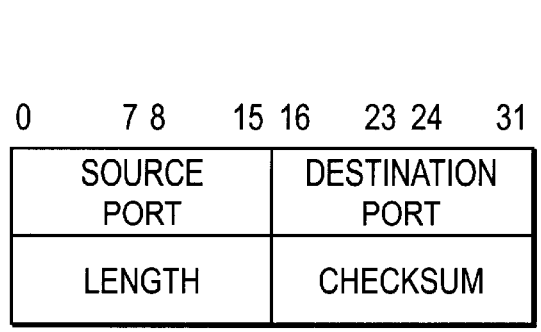
FIG. 5 illustrates the format of the UDP header in FIG. 3.

FIG. 5 illustrates the format of standard UDP header 60. The UDP header 60 includes a source port identifier, a destination port identifier, a length indicator, and a checksum.

Figure 6:
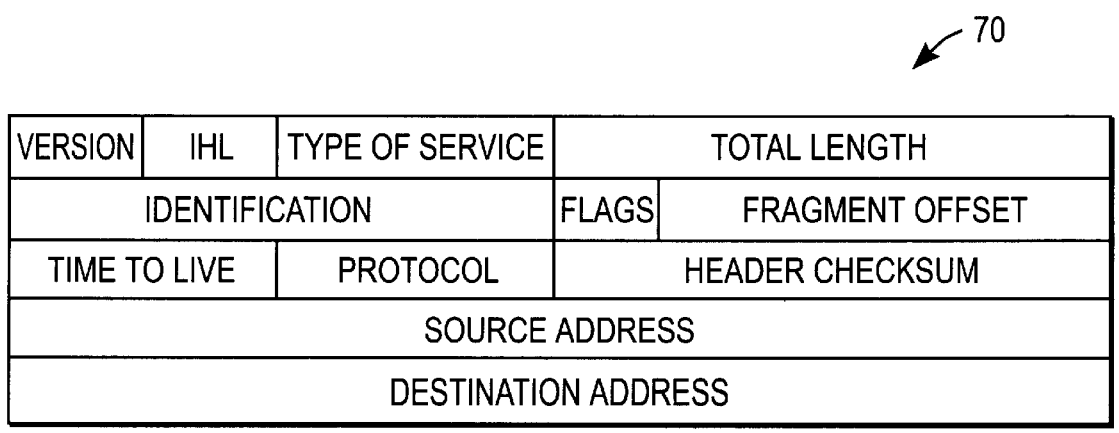
FIG. 6 illustrates the format of the IP header shown in FIG. 3.

FIG. 6 illustrates a standard IP header 70. The IP header 70 includes, among other things, a field identifying the source address and destination address of the network devices sending and receiving the data payload.

Returning to FIG. 3, the rules table 84 can be a user configurable set of stored computer-readable data that determines which packets are discarded. After identifying a packet by its header information, the header analyzer 82 accesses the rules table to determine whether the packet is to be discarded.

The look-up table 86 can be a searchable data structure storable in a computer memory for holding information about received packet sequences. In particular, the look-up table 86 can store a plurality of records, each corresponding to a respective sequence of packets. The records can be used to identify packets in a particular sequence. To accomplish this, each record can contain the source and destination addresses from the IP header, as well as the destination and source part numbers from the UDP header. The memory 88 can be a computer memory for storing header information from various incoming packets, and the counters 90–92 can be software functions executed on a general purpose computer for updating counter variables.

Figure 7:
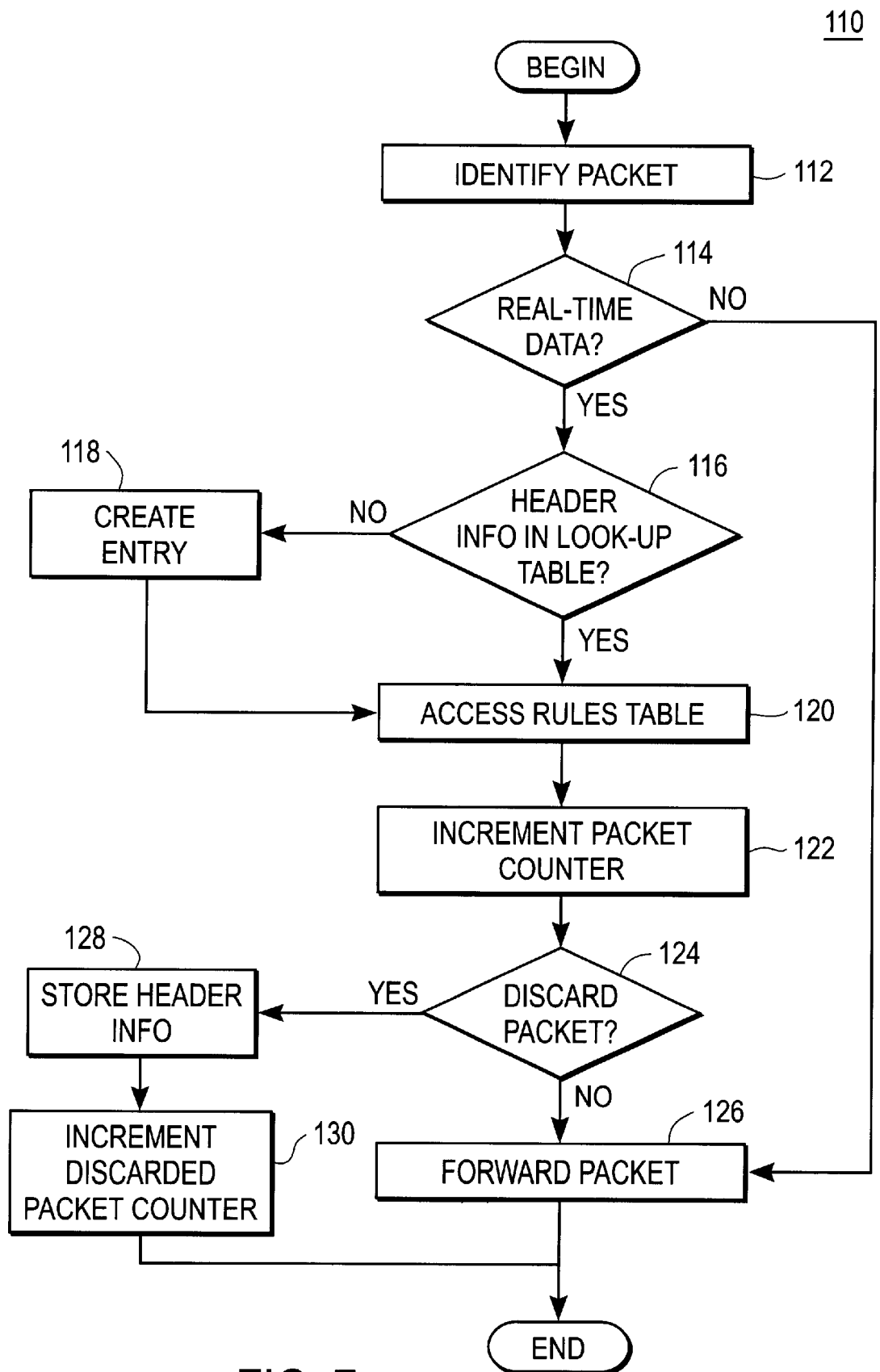
FIG. 7 illustrates a method of inserting packet loss into a data flow according to another embodiment of the present invention.

Turning now to FIG. 7, there is illustrated a method 110 for producing controllable amounts of packet loss in a data flow. The method 110 can be performed by software included in the packet filter 24. In step 112, a packet is identified by the header analyzer 82. This is done by examining the contents of the RTP header and the IP header. For example, the version fields in the RTP header and IP header can be used to determine which versions of RTP and IP are being used. Next, in step 114 a check is made to determine whether or not the data payload includes real-time data. This is accomplished by examining the contents of the payload-type (PT) field 54 included in the RTP header. If the packet does not include real-time data, it is forwarded through the output network interface to the destination host (step 126).

However, if the packet contains real-time data, a check is made in step 116 to determine whether prior data frames in the sequence have already passed through the test apparatus 12. To accomplish this, the source and destination addresses in the IP header and the source and destination port fields in the UDP header are compared to the contents of the look-up table 86 stored within the test apparatus 12. If the header information of the incoming packet matches a previously stored entry in the look-up table, then earlier arriving packets in the sequence have already passed through the test apparatus 12. However, if there is no match, a new entry is created (step 118) in the look-up table 86 for the incoming packet, because the incoming packet represents the first in its sequence of packets. The new entry can contain the source and destination addresses from the IP header, as well as the destination and source port numbers of the UDP header.

In step 120, the rules table is accessed to determine whether or not the incoming packet should be discarded. The rules table can be a software function relying on stored data indicating which packets in a sequence should be discarded. The function can be called by the header analyzer 82.

By altering the stored data used by the rules table, the pattern of packet loss can be varied. For example, if a ten percent packet loss is desired, the rules table can be configured such that either the first ten packets in a sequence are discarded and the next ninety are allowed to flow through the test apparatus. Alternatively, the rules table can be configured to achieve a ten percent packet loss by discarding every tenth packet in a sequence.

In step 122, a packet counter corresponding to the particular sequence is incremented to indicate the total number of packets in the sequence that has passed through the test apparatus 12. A respective count can be kept for each sequence passing through the apparatus 12. Next, in step 124 a determination is made based on the rules table as to whether the incoming packet should be discarded. If the packet is not to be discarded, it is forwarded to the output network interfaces and then to the destination host (step 126). However, if the packet is to be discarded, the header information of the discarded packet is stored (step 128). The stored header information can include the sequence number 52 and time stamp 53 from the RTP header. The stored information can also include data specific to a particular data stream, such as the source and destination addresses of the IP header and the source and destination ports of the UDP header. To discard a packet, the packet is simply not transferred to the destination host via the output network interface. In step 130, the discarded packet counter is incremented.

After completing a test, the stored header information and counter values can be used for analysis at a later time. In addition, statistical data can be automatically computed from the stored information. For instance, the actual percentage of total packet loss for the network under test can be computed by dividing the total number of discarded packets by the number of packets received.

What is claimed is:

1. An apparatus for inserting predetermined packet loss into a data flow between a plurality of hosts on a network, comprising:
   a first network interface for receiving a sequence of data packets included in the data flow;
   a packet filter for selectively discarding one or more of the data packets according to a predetermined rules table in order to generate a reduced sequence of data packets; and
   a second network interface for transferring the reduced sequence of data packets over the network;
   wherein said predetermined packet loss is inserted to determine a network performance responsive to said packet loss.

2. The apparatus of claim 1, wherein the first and second network interfaces include a protocol selected from the group consisting of a UDP/IP protocol and a TCP/IP protocol.

3. The apparatus of claim 1, wherein the data packets include real-time data.

4. The apparatus of claim 3, wherein the data packets include real-time protocol (RTP) data packets.

5. The apparatus of claim 3, wherein the, real-time data is voice data or video data.

6. The apparatus of claim 1, further comprising means for inspecting header information included in each of the data packets.

7. The apparatus of claim 6, further comprising means for storing the header information.

8. The apparatus of claim 7, wherein the stored header information includes source and destination addresses.

9. The apparatus of claim 7, wherein the stored header information includes port numbers.

10. The apparatus of claim 1, further comprising a counter for counting the number of incoming data packets.

11. The apparatus of claim 1, further comprising a counter for counting the number of discarded packets.

12. A method of inserting predetermined packet loss into a data flow between a plurality of hosts, comprising:
    detecting a sequence of data packets in the data flow;
    accessing a predetermined rules table to determine which of the data packets to discard; and
    inserting the packet loss by discarding ones of the data packet according to the rules table;
    wherein said predetermined packet loss is inserted to determine a network performance.

13. The method of claim 12, further comprising:
    determining the protocol by which the data packets are transferred.

14. The method of claim 12, wherein the data packets are real-time protocol (RTP) packets.

15. The method of claim 12, further comprising:
    determining whether the data packets carry real-time data selected from the group consisting of voice data and video data; and
    forwarding packets, without inserting loss, that do not carry real-time data.

16. The method of claim 12, wherein the step of detecting includes:
    receiving a first data packet in the sequence;
    storing header information included in the first data packet; and
    comparing header information of subsequent data packets to the stored header information of the first data packet to determine which of the subsequent data packets belong to the sequence of data packets.

17. The method of claim 12, further comprising:
    storing header information included in the discarded ones of the data packets.

18. A computer-readable memory storing a program for directing a computer to insert predetermined packet loss into a data flow over a network between a plurality of hosts by detecting a sequence of data packets in a data flow, accessing a predetermined rules table to determine which of the data packets to discard, and inserting the packet loss by discarding ones of the data packet according to the rules table, wherein said predetermined packet loss is inserted to determine a network performance.

* * * * *